United States Patent

Maul et al.

[11] Patent Number: 5,527,576
[45] Date of Patent: Jun. 18, 1996

[54] HEAT-SEALABLE PLASTIC FILMS

[75] Inventors: Jürgen Maul, Marl; Werner Siol, Darmstadt-Eberstadt; Ulrich Terbrack, Reinheim, all of Germany

[73] Assignee: Roehm GmbH Chemische Fabrik, Darmstadt, Germany

[21] Appl. No.: 332,751

[22] Filed: Nov. 1, 1994

Related U.S. Application Data

[62] Division of Ser. No. 122,654, Sep. 17, 1993, abandoned.

[30] Foreign Application Priority Data

Sep. 19, 1992 [DE] Germany ............ 42 31 395.3

[51] Int. Cl.$^6$ ............ B65D 41/20; B65D 65/40; B32B 27/30; C08L 33/10
[52] U.S. Cl. ............ 428/36.6; 428/349; 428/352; 525/80; 525/93; 525/227
[58] Field of Search ............ 525/80, 85, 93, 525/227; 428/36.6, 349, 352

[56] References Cited

U.S. PATENT DOCUMENTS

| | | | |
|---|---|---|---|
| 4,897,441 | 1/1990 | Siol | 525/308 |
| 5,322,900 | 6/1994 | Siol | 525/227 |

OTHER PUBLICATIONS

Neue Verpackung, vol. 9, 1991, pp. 94–97 and 100–101, Dr. G. Stehle, "Verschlusse Fur Becher Und Schalen".
Ullmann's Encyclopedia of Industrial Chemistry, 5th Edition, vol. A11, pp. 523–560 and 583–618, 1988.
Zade, "Heatseal & High Frequency Welding Of Plastics", Temple Press, p. 31.

*Primary Examiner*—David Buttner
*Attorney, Agent, or Firm*—Oblon, Spivak, McClelland, Maier & Neustadt

[57] ABSTRACT

This invention relates to plastic containers hermetically sealed with a peelably heat-sealable plastic film comprised of a polymeric mixture comprised of 1–99 parts by weight (pbw) of an impact-resistant polystyrene resin and 99–1 pbw of a copolymer consisting essentially of:

p1) 20–90 weight % methyl methacrylate, ethyl methacrylate or a mixture thereof;

p2) 10–80 weight % of at least one monomer of formula (I):

$$CH_2=C(CH_3)-C(=O)-O-R_1, \quad (I)$$

and where $R_1$ represents an alkyl group with 3–24 C atoms; and p3) 0–10 weight %, preferably 1–8 weight %, of a monomer which is copolymerizable with and different from the monomers (p1) and (p2).

2 Claims, No Drawings

HEAT-SEALABLE PLASTIC FILMS

This is a division, of application Ser. No. 08/122,654 filed on Sep. 17, 1993 now abandoned.

FIELD OF THE INVENTION

The invention relates to heat-sealable plastic films comprising a mixture of an impact resistant plastic polystyrene resin and a methacrylate copolymer. These films are useful for hermetically sealing plastic container such as polystyrene containers. In particular, the plastic films are suitable for sealing foodstuffs into containers for storage.

DISCUSSION OF THE BACKGROUND

Plastic containers are currently more popular than containers composed of wood or inorganic materials such as metal, glass, or ceramics, for storage especially for food storage. An important factor in food storage, whether the food is prepared for storage by dehydration, freezing, or sterilization, is the complete inhibition of microbial growth. This can be achieved by sealing foodstuffs into containers with gastight seals.

Important factors critical for preserving foodstuffs in containers with gastight seals include the mechanical strength, durability, ability to maintain water and ability to minimize the effects of the atmosphere and light on the preserved foodstuff of the gastight seals (see "Ullmann's Encyclopedia of Industrial Chemistry", 25th Ed., Verlag Chemie: Weinheim, 1985, pp. 523–560 and 583–618; the applicable standards are also discussed therein).

Previously gastight seals composed a layer of aluminum coated with a sealing coating have been used to seal plastic containers holding food, particularly dairy products such as yogurt. Aluminum seals are typically comprised of a three-layered laminate. The outer layer frequently comprises biaxially oriented polyethylene terephthalate (O-PET), biaxially oriented polypropylene (O-PP), biaxially oriented polyamide (O-PA) or cellulose. The middle layer comprises aluminum. The heat-sealable inner layer adjoining the aluminum layer typically comprises polyethylene, ethylene copolymers, or polypropylene (Stehle, G. (1991) Neue Verpackung, 9:94–101). U.S. Pat. No. 4,753,708 describes heat-sealable coatings for metal foils which are suitable for sealing various substrates, such as polystyrene substrates. The coatings comprise a film-forming dispersion of a graft polymer based on an olefin and a (meth)acrylate, in an organic solvent. However, the use of aluminum for packaging has recently met with ecological and economic objections.

Accordingly, gas tight seals composed of plastic films with sealable coatings are being used. Hard polyvinylchloride (PVC) increasingly is widely used as a relatively inexpensive material for sealable films. Hard PVC has good mechanical strength and good barrier characteristics with regard to gas permeability. Customarily an acrylic resin is used as a sealing coating layer. The adhesiveness and melting point of the acrylic resin can be modified with additives.

Unfortunately the high permeability of certain plastics to gases and vapors can lead to problems in food preservation when the plastics are used as packaging materials. Multilayer films have been suggested to overcome this problem (see German Patent 35 31 036 and European Patents 0 406 681 and 0 437 745).

German Patent 35 31 036 describes plastic films produced by coextrusion comprising a sealable layer of an impact resistant polystyrene, a block copolymer, and a lubricant, possibly applied to a support layer.

European Patent 0 406 681, discusses the problems of using heat-sealable plastic films instead of aluminum laminates. As a rule, plastic seals require much narrower processing ranges (usually between 10° and 20° K.) than aluminum seals. The processing temperature must be continuously monitored in order to ensure problem-free production and use of the sealed package. When the containers being sealed consist of a plurality of cavities which must be simultaneously filled, such as cups or the like, processing requirements are often difficult to meet. To solve these problems, European Patent 0 406 681 describes a plastic film produced by coextrusion or roll-lamination of two or three layers (optionally separated by intermediate layers), wherein each layer contains an adhesive for binding the layers together. The film comprises 1–50% of a layer of a heat-sealable impact resistant polystyrene, up to 95% of a support layer, and 1–99% of a high melting plastic layer, wherein the sum of the thicknesses or weights of all layers is 100%.

European Patent 0 437 745 describes a sealable thermoplastic molding compound comprising at least four components: an impact resistant polystyrene resin, a block copolymer, a lubricant, and at least one homo- or copolymer of an aliphatic olefin. The sealable molding compound is applied to conventional support films, preferably comprised of polystyrene. The films are useful for sealing polystyrene or polyolefin (such as polyethylene or polypropylene) containers.

Unfortunately, multilayer films are expensive, difficult to dispose of properly and cannot be recycled. A heat-sealable film which is suitable for gastight sealing of plastic containers, particularly polystyrene containers, in a homogeneous layer and without additional surface treatment, is described in German Patent Applications P 41 42 691.6 and P 41 42 692.4. These films are directly sealable to polystyrene with the use of ordinary apparatus. These heat-sealable plastic films are based on polystyrene-compatible methacrylates comprising a molding compound with a two-phase structure. The grafting branches, and the ungrafted parts, of the impact resistant phase, are compatible with polystyrene. German Patent Applications P 41 42 691.6 and P 41 42 692.4 also relate to multilayer composite films wherein the above-mentioned molding compounds are processed to form support films and in a second step are coated with polystyrene-compatible molding compounds which have a two-phase structure.

However, in the case of multilayer composite films comprised of a support film produced from a polystyrene-compatible molding compound with a two-phase structure and a sealing layer comprised of a polystyrene-compatible readily flowable molding compound, a large difference in viscosity between the molding compound of the support layer and the molding compound of the sealing layer exists which creates problems in processing. Further, these (meth-)acrylate films do not always have adequate tear strength under mechanical load.

SUMMARY OF THE INVENTION

Accordingly, one object of the present invention is to provide a heat-sealable plastic film which has good recyclability, mechanical stability, processibility, and manufacturability (particularly by coextrusion).

The present inventors have now found that this object can be achieved by a heat-sealable plastic film comprising a mixture of 1–99 parts by weight (pbw) of an impact-resistant polystyrene resin and 99–1 pbw of a copolymer P consisting essentially of:

p1) 30–90 weight % methyl methacrylate, ethyl methacrylate or a mixture thereof;

p2) 10–70 weight % of at least one monomer of formula (I):

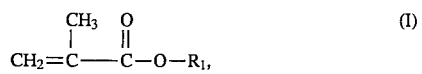

where $R_1$ represents a $C_{3-24}$ alkyl group; and p3) 0–10 weight %, preferably 1–8 weight %, of a monomer which is copolymerizable with and different from the monomers (p1) and (p2).

Preferably, the impact resistant polystyrene resin (PS) is present in the heat-sealable plastic film in proportions of 20–80 weight %. The impact resistant polystyrene resin preferably comprises polymers such as styrene-butadiene-styrene block copolymers which improve the impact strength of the plastic films and improve their processibility in an extruder. The plastic films suitably have thicknesses between 50 and 500 micron, preferably 80 and 400 micron. Optionally the plastic film also has a cover layer which prevents adhesion of the sealing film to the sealing head.

DETAILED DESCRIPTION OF THE PREFERRED EMBODIMENTS

Suitable impact resistant polystyrene resins (PS) in accordance with the present invention are two-phase polymer mixtures comprising (i) a polymeric hard phase which forms a matrix and which preferably contains vinylaromatic monomer units and (ii) a polymeric impact resistant phase formed by 0.01–20 micron particles which are finely dispersed in the hard phase matrix. The polymeric hard phase is preferably 50–95 weight %, more preferably 60–95 weight %, and particularly preferably 80–95 weight %, of the total weight of the two-phase polymer mixture.

Suitable vinylaromatic monomer units useful in the hard phase include styrene, α-methylstyrene, p-methylstyrene, or other substituted styrenes and mixtures thereof. Preferably styrene is used. The weight average molecular weights of the hard phase polymers are in the range 50,000–500,000 Dalton, preferably 100,000–350,000 Dalton.

Suitable polymers useful for the impact resistant phase have glass transition temperatures <10° C., preferably <-10° C., and ordinarily are classified as "elastomers" or "rubbers". Crosslinked and uncrosslinked polymers of polysiloxanes, ethylene-vinyl acetate copolymers, polyacrylates, or polyolefins are suitably used. Preferably, polyolefins are used, particularly preferably polydienes.

Suitable polyolefins useful in the impact resistant phase include homo- or copolymers of ethylene, propylene, or isobutylene (see "Ullmanns Enzyklopaedie der technischen Chemie" 4th Ed , Vol 19, Verlag Chemie, 1980 pp 167–226). In general, the weight average molecular weight of the uncrosslinked polyolefins is of from 50,000–1,000,000 Dalton (determined, for example by gel permeation chromatography as described by Mark et al., "Encyclopedia of Polymer Science and Engineering" 2nd Ed Vol. 10, Jo Wiley, 1987, pp. 1–19). Preferably, ethylene-propylene-diene (EPDM) terpolymers, wherein the diene component is dicyclopentadiene, ethylidenenorbornene, or hexadiene, are used (see Ullmann, supra 4th Ed., Vol. 13, pp. 619–621; Kirk-Othmer, "Encyclopedia of Industrial Chemistry", 3rd Ed., Vol. 8, J. Wiley, 1979, pp. 492–500 and Vol. 7, pp. 687 and 693. Cesca, S., J. Polym. Sci., Macromol. Rev., 1975, 10: 1) EPDM terpolymers can be produced as described in the above references, the text of which are incorporated herein by reference.

Particularly preferred polydienes comprise the well known rubber types including polybutadiene, poly-2-chlorobutadiene, or polyisoprene (see Ullmann, supra, 4th Ed., Vol. 13, pp. 595–635). Preferably the impact resistant phase comprises polybutadiene, particularly preferably grafted with styrene monomer units. In this case, medium-cis or high-cis polybutadienes with weight average molecular weights of 70,000–450,000 Dalton are preferably used. The impact resistant phase is finely dispersed in the hard phase matrix. The impact resistant particles are present in the hard phase in proportions of 5–50 weight %, preferably 5–40 weight %, particularly preferably 5–20 weight %, based on the total weight of the two phase polymer mixture. The mean particle sizes of the dispersed impact resistant phase, are in the range 0.01–20 micron, preferably 0.3–10 micron, and can be determined, for example, by electron microscopy.

Suitable impact resistant polystyrene resins (PS) in accordance with the present invention can be produced by conventional methods. High impact polystyrene resins can be manufactured, for example, by polymerization in bulk, suspension polymerization or emulsion polymerization (see Kirk-Othmer, supra, Vol. 17, 1982, pp. 470–471, and Vol. 21, 1983, pp. 811–816).

The impact resistant polystyrene resin (PS) can also contain styrene-butadiene block copolymers and/or styrene-isoprene block copolymers, wherein multiblock copolymers such as 2-block-, 3-block-, and star-block copolymers can be used. (For synthesis of block polymers of styrene and a second monomer, see, for example, Houben-Weyl, "Methoden der organischen Chemie", 4th Ed., Vol. E20 Part 2, Georg Thieme: Stuttgart, 1987, pp. 987–993). Preferably, styrene-butadiene-styrene 3-block copolymers or star-shaped styrene-butadiene copolymers with a high content of butadiene, >50 weight %, are suitable for modifying the polystyrene resins, particularly for modifying the tear strength. In a preferred embodiment the polystyrene resins comprise at least 2 weight % of a styrene-butadiene-styrene block copolymer, and in a particularly preferred embodiment 5–20 weight % of a styrenebutadiene-styrene block copolymer comprising 50–80 weight % of butadiene components, based on the total weight of the polystyrene resin.

Alternatively, the impact resistant polystyrene resin (PS) can be comprised entirely of block copolymers. In this case, a smaller proportion of the butadiene in the block copolymer is used, so that the overall content of butadiene in the polystyrene resin is <50 weight %, preferably <40 weight %, and particularly preferably in the range 10–30 weight %.

Particularly preferred polystyrene resins (PS) are impact resistant polystyrene types which contain particles of an impact-resistant phase –obtained, for example, by radical polymerization of styrene in the presence of polybutadiene. As a rule, the particles of the elastomer phase have sizes of 1–5 micron, preferably 2–4 micron, as an average, wherewith the polybutadiene content of this polystyrene resin containing particles of the impact resistant phase is in general 7–15 weight %, preferably 8–11 weight % (based on the total weight of the polystyrene resin). The polystyrene resin can also contain the usual additives employed in polymer processing for including lubricants (such as paraffin oil), stabilizers (e.g., radical scavengers), and/or pigments.

Suitably copolymer P consists essentially of the above-mentioned components (p1), (p2), and (p3). That is, the sum of the monomer units (p1), (p2), and (p3) is 100 weight %. Copolymer P is suitably formed from the monomers (p1), (p2), and optionally (p3) by conventional methods such as radical or anionic polymerization (see Rauch-Puntigam, H., and Voelker, T., 1967, "Acryl- und Methacrylverbindungen", Springer-Verlag, Heidelberg; and Houben-Weyl, 1961, 4th Ed., Vol. XIV/1, Georg Thieme, pp. 1010; the texts of which are incorporated herein by reference), and/or by group transfer polymerization (see, Houben-Weyl, 1987, supra, Vol. E20, pp. 153–160, the text of which is incorporated herein by reference). Copolymer P can suitably be polymerized in bulk, in suspension, in emulsion, or in solution.

In the case of radical polymerization, suitable initiators include peroxide compounds, particularly organic peroxides such as dibenzoyl peroxide or lauroyl peroxide, peresters such as t-butyl perneodecanoate or t-butyl per-2-ethylhexanoate, perketals, azo compounds such as azodiisobutyronitrile, or redox initiators. The initiators suitably are used in amounts of 0.01–5 weight % (based on the total weight of the monomers).

Radical polymerization can alternatively be initiated by high energy radiation. Suitable polymerization regulators include sulfur compounds such as mercapto compounds, in amounts of 0.1–5 weight % (based on the total weight of the monomers).

The weight average molecular weight of colpolymer P is suitably 2,000–1,000,000 Dalton, preferably 10,000–200,000 Dalton, particularly preferably 20,000–100,000 Dalton, (determined, for example, by GPC).

The nonuniformity of copolymer P is suitably in the range 0.1–3. The nonuniformity is calculated according to the formula:

$$U = M_w/M_n - 1,$$

where $M_w$ is the weight average molecular weight of copolymer P and $M_n$ is the number average molecular weight of copolymer P.

Preferably copolymer P contains 20–90 weight % of monomer units (p1) and 10–80 weight % of monomer units (p2) of the formula (I), where $R_1$ represents a $C_{3-24}$ alkyl group, preferably a $C_{4-18}$ alkyl group.

Preferably the relative proportion of monomer (p2) in copolymer P decreases as the number of carbon atoms in $R_1$ increases. Quantitatively, the proportion of monomers (p2) in copolymer P may be expressed as follows (see German Patent 37 30 025 also U.S. Pat. No. 4,952,455):

$$\text{weight \% of monomer } p2 = \frac{\text{Molecular weight of monomer } p1}{(\text{Molecular weight of monomer } p1 + \text{Molecular weight of monomer } p2)} \times 100.$$

Suitable monomers (p2) according to formula (I) are methacrylic acid esters wherein $R_1$ represents propyl, n-butyl, isobutyl, amyl, isoamyl, n-pentyl, n-hexyl, n-octyl, 2-ethylhexyl, n-decyl, n-dodecyl, n-tetradecyl, n-hexadecyl, n-stearyl or the alkyl group of a tallow fatty alcohol. $R_1$ can also represent a substituted or unsubstituted cycloalkyl group such as cyclopentyl, cyclohexyl, or cycloheptyl. Suitable substituents include methyl, ethyl or butyl. Preferably $R_1$ is cyclohexyl.

Suitable comonomers (p3) are present in copolymer P in amounts of 0–10 weight %, preferably 1–8 weight %. Suitable comonomers (p3) include (meth)acrylic acid, salts of (meth)acrylic acid, hydroxyalkyl esters of (meth)acrylic acid (such as 2-hydroxyethyl (meth)acrylate, or 2-hydroxypropyl (meth)acrylate), alkoxyalkyl esters of (meth)acrylic acid (such as 2-butoxyethyl (meth)acrylate or 2-methoxyethyl (meth) acrylate) and aminoalkyl esters of (meth) acrylic acid (such as 2-dimethylaminoethyl (meth)acrylate, 2,2,6,6-tetramethyl-4-piperidyl (meth)acrylate, and 3-dimethylaminopropyl (meth)acrylate). Alternatively, (p3) is styrene or a $C_{1-20}$ ester of acrylic acid. Suitably, the proportion of acrylic acid esters in copolymer P is limited to <5 weight %, preferably <1 weight %, and particularly preferably zero.

In accordance with the present invention, copolymer P forms a compatible polymeric mixture with the impact resistant polystyrene resin (PS). The polymeric mixture can be characterized according to recognized criteria (see Kirk-othmer, supra, Vol. 18, pp. 457–460; and Brandrup et al "Polymer Handbook" 2nd Ed , Vol III, Wiley Interscience, 1975, p. 211). The compatible polymer mixture suitably has a single index of refraction and a single glass transition temperature which is between the glass transition temperatures of the two components, copolymer P and the polymeric hard phase of the impact resistant polystyrene resin (PS).

As a further indication of the compatibility of the polymeric mixture, there is the occurrence of an LCST. This phenomenon occurs when upon heating a clear, transparent polymeric mixture separates into different phases and becomes optically cloudy. This is unambiguous evidence that the original polymer mixture comprised a single phase in thermodynamic equilibrium (see, Paul, D.R., "Polymer Blends and Mixtures" Martinus Nijhoff, Dordrecht and Boston, 1985, pp. 1–3). Although the polymer mixture of the present invention is not complete compatibility in the sense of a polymer blend with only a single glass temperature which is dependent upon composition, the plastic film of the present invention adheres well to polystyrene substrates when the composition of copolymer P is strictly observed. Further, the total assembly can be recycled easily, as a consequence of the good compatibility of the plastic film and the polystyrene substrate which is to be sealed.

According to the invention, copolymer P can be 40–60 weight % methyl methacrylate and 60–40 weight % butyl methacrylate. Alternatively, copolymer P can be 70 weight % methyl methacrylate and 30 weight % n-decyl methacrylate.

Preferably, the number of carbon atoms in the substituent $R_2$ of monomer component (p2) should exceed the number of carbon atoms in the methyl or ethyl substituent of monomer component (p1) by >2, particularly preferably >3. Preferably, copolymer P comprises 50 weight % methyl methacrylate and 50 weight % butyl methacrylate with a J-value of 15–70 ml/g, preferably J=20–40 ml/g. (See DIN 51 562 for the determination of the J-value, which is performed in chloroform at 25° C. and is a measure of the molecular weight of the copolymer) or approximately 50 weight % ethyl methacrylate and approximately 50 weight % butyl methacrylate with a J-value of 20–50, preferably 25–40 ml/g.

Preferably the polymeric mixtures comprise 20–90 weight % of the above-described copolymer P and 80–10 weight % of one or more block copolymers comprised of at least one block of one or more monomers selected from styrene, α-methylstyrene, and alkyl substituted styrene, and at least one block selected from isoprene and butadiene. The block copolymers can be linear, branched, or star-shaped.

Particularly preferred block copolymers in the polymeric mixture comprise 2 or more polystyrene blocks such as linear styrene-butadiene-styrene (SBS) 3-block copolymers, and radial or star-shaped SBS block copolymers. Particularly preferred are SBS block polymers which contain at most 50 weight % of styrene blocks; and still more preferred are linear SBS tri-block copolymers having a butadiene content of approximately 70 weight %.

In addition to the above-mentioned block copolymers with a high butadiene content, styrene-butadiene block copolymers with butadiene contents of <50 weight % may also be present in the polymeric mixture.

Mixtures of the above-mentioned SBS block copolymers with copolymer P are much more impact resistant than copolymer P itself. Thus, such mixtures display high extensibility and tear strength. Mixtures comprised of block copolymers and copolymer P can be sealed to impact resistant polystyrene at low temperatures (e.g., 140°–200° C.). Particularly advantageous is the good behavior of these mixtures as sealants when plastic containers sealed with them are opened. Plastic containers sealed with them can be peeled opened smoothly and compliantly without jerking action.

Suitably, mixtures comprised of 75–25 pbw of block copolymers and 25–75 pbw of copolymer P are used. Particularly preferred mixtures comprise block copolymers and copolymer P in the weight ratio range 65:35 to 35:65.

In addition to the above-described SBS block copolymers with high (>50 weight %) butadiene content, block copolymers with, 15–40 weight % butadiene can be used. These latter are generally highly transparent, impact resistant polystyrene molding compounds. These block copolymers are also very suitable to use in the sealing layer for modifying the rheology of the copolymers. In general, however, the pulling-away (peeling) behavior (upon opening) of containers sealed with mixtures with SBS block copolymers having butadiene content >50% is better than that for containers sealed with these sealing layers. Preferably the sealing comprises at least 3 components, (i) copolymer P (in the amount of 45–65 weight %), (ii) the block copolymers with butadiene content >50 weight percent (in the amount of 10–35 weight %), and (iii) the block copolymers with butadiene content 15–50 weight percent (in the amount of 10–35 weight %). The weight average molecular weights of the SBS block copolymers used are in the range 50,000–500,000 Dalton, preferably 80,000–300,000 Dalton, and particularly preferably 100,000–250,000 Dalton. The melt-flow index of the SBS-block copolymers (without addition of copolymers) is generally in the range 4–20 g/10 min, preferably 5–10 g/10 min, at 200° C. (for 5 kg).

Beside these particularly preferred styrene-butadiene block copolymers, the corresponding block copolymers based on isoprene, or the corresponding hydrogenated block copolymers comprising styrene-(ethylene-butylene)-styrene block copolymers and/or styrene-(ethylene-propylene)-styrene block copolymers, can also be employed. The synthesis of the styrene-butadiene or styrene-isoprene block copolymers is carried out in general by means of anionic polymerization (see Houben-Weyl, supra, 4th Ed., Vol. E20/2, p. 989), usually with alkyllithiums as initiators.

In addition to the above-mentioned modification of the copolymers by mixing with block copolymers based on SBS, modification is possible by means of elastomer-copolymer graft products. Of particular interest are emulsion polymers with a core-and-shell structure wherein a shell comprised of copolymer is at least partially grafted onto an acrylate rubber (such as butyl acrylate crosslinked with allyl methacrylate). Such impact strength-modified copolymers with an elastomer content of 1–65 weight %, preferably 10–50 weight %, are suitable for use as such or in a mixture with other copolymers, as materials for the plastic films.

Mixtures produced in this manner, and having the described composition, have high flowabilities, and may be used as plastic films to seal a suitable substrate (as a rule, polystyrene) at low temperatures (130°–200° C.).

The plastic films according to the present invention are comprised of the above-described mixtures which contain at least 1 weight %, preferably at least 10 weight %, particularly preferably at least 20 weight %, of impact resistant polystyrene resin, such as, SBS block copolymers. They can be fabricated by conventional methods, for example by extrusion.

Plastic films in accordance of the present invention suitably have thicknesses of 50–500 micron, preferably 80–400 micron.

Particularly suitable proportions of block copolymers in the polymeric mixtures are 20–90 weight %, preferably 30–80 weight %, particularly preferably 35–65 weight %, for the heat-sealing plastic films.

The plastic films according to the present invention can be heat-sealed without problems (see Stehle, Go, "Neue Verpackung", supra) and have good processing reliability. The plastic films are deep-drawable, stampable, punchable, and pressable. They can be successfully colored by the conventional coloration methods for plastics (see Becker-Braun, 1990, "Kunststoff-Handbuch", Vol. 1, Carl Hanser, pp. 539–540).

The plastic films are particularly advantageously used for sealing plastic containers, especially containers comprised of polystyrene and impact-strength-modified polystyrene. Plastic containers sealed with covers comprising the plastic films of the present invention satisfy the above-stated requirements for mechanical and chemical stability, thermal behavior, and processibility. The sealing conditions (for example, the temperature of the sealing coating, or the pressure) may be varied within wide limits.

Of particular interest is the fact that the films are easy to seal, allowing sealing in 0 5 sec at 140° C. even using a film 100 micron thick. Thicker films require correspondingly higher temperatures or longer sealing times. This is principally a consequence of the extremely good heat-sealability of the mixtures.

The low sealing temperatures frequently render unnecessary an antiblock coating to impede adhesion of the film to the hot sealing head. In general, however, it is advantageous to employ an antiblock coating if the plastic film contains an additional protective layer which impedes baking to the sealing head. Often this layer comprises a protective coating material used to mark the container. Suitably, the plastic film can have an antiblock layer which is 2–50 micron, preferably 5–20 micron thick, comprised of a high melting plastic which does not adhere to the sealing head at temperatures up to 200° C. (preferably up to 250° C.). Suitable antiblock coatings comprise high melting plastics such as polyamides (such as Polyamide 6), or polyterephthalic acid esters (such as polybutylene terephthalate), or impact-strength-modified polyphenylene ethers (PPEs), or in general polymers with softening point >160° C.

Plastic films of the present invention have the following properties:

The films are suitable for stamping, punching, and pressing;

In the case of punching, the wastes can be reprocessed to produce new films;

The films are suitable for printing;

The plastic films can be produced to have high impact strength, so as to be usable under high load-bearing and high stacking conditions;

Copolymer P, the impact resistant polystyrene resin, and the (optionally impact resistant) polystyrene of the container are completely compatible, so that one may recycle the containers and covers together;

The inventive films can be sealed directly to polystyrene. In general, the plastic films are sealed to containers comprising impact resistant polystyrene, which is as a rule an extrusion polystyrene, such as VESTYRON® 638. Frequently the impact resistant polystyrenes contain additional highly transparent polystyrene, such a container may be produced from a mixture of VESTYRON® 638 and VESTYRON® 224 (both products are available from Huels AG); and The films may be sealed on apparatus customarily used for heat sealing (examples of conditions: sealing pressure >2 bar, time 0.1–2 sec, sealing temperature 130°–220° C.).

Preferably sealing heads are used which have a coating of Teflon or another material which impedes blocking. If the sealing film itself is provided with a non-blocking final coating or has an antiblock layer, one may employ a metallic sealing head, such as an aluminum sealing head.

The inventive films may be adjusted such that punching wastes or other residues of the film are used in their entirety to produce a new plastic film.

Obviously, all of the components of the plastic film which are subject to come into contact with foods have minimum contents of residual monomers and other components which can detract from the usability of the film.

Having generally described this invention, a further understanding can be obtained by reference to certain specific examples which are provided herein for purposes of illustration only and are not intended to be limiting unless otherwise specified.

EXAMPLES

Example 1: Production of a copolymer p1 by polymerization in mass:

To a mixture of 500 g methyl methacrylate, 500 g butyl methacrylate, and 14 g dodecyl mercaptan was added 1.5 g t-butyl perneodecanoate and 0.5 g t-butyl per-2-ethylhexanoate. The mixture was charged to a plastic jar (HOSTAPHAN® available from Hoechst AG), and was polymerized in a water bath 24 hr at 45° C., followed by 10 hr at 80° C.

The resulting copolymer was comminuted in a mill, and the mill granules were then further comminuted, and degassed in an extruder.

The product obtained was a highly transparent, very readily flowing copolymer, J=20 ml/g.

Example 2: Production of the mixture comprised of copolymer p1 and impact resistant polystyrene resin; and production of the plastic film.

The copolymer p1 according to Example 1, in the amount of 45 weight %, was mixed in a drum mixer with 55 weight % of an impact resistant polystyrene resin (CARIFLEX® TR 1102, available from Shell), and the resulting mixture was then granulated twice with an extruder, and degassed. The result was a white granulate which was extruded on a film extruder at 200° C. to form a film KFl of thickness 270 micron and width 120 mm.

Example 3: Production of covers from the plastic film; and heat-sealing of polystyrene cans.

From the plastic film produced according to Example 2, covers were stamped, and were sealed to polystyrene cans (purchased from Knauer, having capacity 200 ml, and cover diameter 75 mm) at a sealing temperature of 180° C., a sealing pressure of 0.8 bar, and a sealing time of 0.5 sec. The cans were sealed well and had good opening characteristics ("peeled" very well).

Also, strips of polystyrene (POLYSTYROL 466 J, available from BASF AG) 1.5 cm wide were sealed with the plastic films produced according to Example 2, 1.5 cm wide (sealing surface 1.5 cm×1.0 cm), at sealing temperatures of 230° C. sealing pressure 2.5 bar, and sealing time 0.5 sec. The thus sealed strips had a separation strength (peeling strength) of 6.6 N.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A hermetically sealed plastic container, comprising a container having an opening and a plastic film peelably heat-sealed to the container to hermetically seal the opening of the container, said plastic film comprising a polymeric mixture comprising 1–99 parts by weight (pbw) of an impact-resistant poly(vinylaromatic) resin and 99–1 pbw of a copolymer of monomers consisting essentially of:

p1) 20–90 weight % methyl methacrylate, ethyl methacrylate or a mixture thereof;

p2) 10–80 weight % of at least one monomer of formula (I):

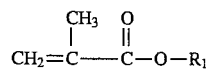

wherein $R_1$ represents a $C_{3-24}$ alkyl group; and p3) 0–10 weight % of one or more monomers copolymerizable with toohomers (p1) and (p2) and said plastic film further comprising a layer which impedes adhesion of said plastic film to a sealing head.

2. The hermetically sealed plastic container according to claim 1, wherein said layer which impedes adhesion is comprised of a plastic which has a softening point >160° C.

* * * * *

UNITED STATES PATENT AND TRADEMARK OFFICE
CERTIFICATE OF CORRECTION

PATENT NO.  : 5,527,576
DATED       : June 18, 1996
INVENTOR(S) : Juergen MAUL, et al.

It is certified that error appears in the above-indentified patent and that said Letters Patent is hereby corrected as shown below:

On the title page, Item [30], The Foreign Application Priority Data shoul read:

-- [30] Sep 19, 1992 [DE] Germany ........ 42 31 395.3

Nov 24, 1992 [DE] Germany ........ 42 41 682.5 --

Signed and Sealed this

Twenty-fourth Day of September, 1996

Attest:

BRUCE LEHMAN

Attesting Officer          Commissioner of Patents and Trademarks